United States Patent [19]
Strong

[11] 3,856,569
[45] Dec. 24, 1974

[54] PROCESS FOR THE PURIFICATION AND CONCENTRATION OF SOLUTIONS DERIVED FROM MARINE ALGAE

[75] Inventor: Clifford H. G. Strong, Guelph, Ontario, Canada

[73] Assignee: Uniroyal, Ltd., Montreal, Canada

[22] Filed: Sept. 7, 1972

[21] Appl. No.: 287,178

[30] Foreign Application Priority Data
Aug. 16, 1972 Canada.............................. 149534

[52] U.S. Cl.................... 127/34, 127/46 R, 127/54, 210/23, 260/209.6
[51] Int. Cl....................... B01d 13/00, C07c 47/18
[58] Field of Search............ 127/34, 54, 46 A, 46 R; 210/23; 260/209.6

[56] References Cited
UNITED STATES PATENTS

| | | | |
|---|---|---|---|
| 2,128,551 | 8/1938 | Le Gloahec | 260/209.6 |
| 2,620,334 | 12/1952 | Nielsen | 99/131 X |
| 2,638,470 | 5/1953 | Alburn | 260/209.6 |
| 2,653,106 | 9/1953 | Bonniksen | 260/209.6 X |
| 2,688,586 | 9/1954 | Eberl | 260/209.6 X |
| 3,062,737 | 11/1962 | Azorlosa | 127/54 X |
| 3,228,876 | 1/1966 | Mahon | 127/54 X |
| 3,342,729 | 9/1967 | Strand | 127/54 X |
| 3,396,158 | 8/1968 | Haug | 260/209.6 |
| 3,526,588 | 9/1970 | Michaels | 210/23 |
| 3,556,992 | 1/1971 | Massucco | 210/23 |
| 3,668,007 | 6/1972 | Egger | 127/54 X |

*Primary Examiner*—Morris O. Wolk
*Assistant Examiner*—Sidney Marantz
*Attorney, Agent, or Firm*—Robert J. Patterson, Esq.

[57] ABSTRACT

Method of purifying and concentrating aqueous solutions derived from marine algae by subjecting such solutions to ultrafiltration whereby water and low molecular weight compounds in the solution are caused to pass through the membrane or microporous filter medium of the ultrafiltration equipment and to emerge as ultrafiltrate while the desirable polysaccharide, such as carrageenan or alginate, is retained by the membrane or the like and is recovered in concentrated form.

In one method wherein the polysaccharide extract of marine algae of the class Rodophyceae in the starting solution is in the form of the calcium derivative, the starting solution is subjected to ion exchange so as to effect replacement of the calcium with potassium, sodium or ammonium and the resulting solution is then subjected to ultrafiltration.

20 Claims, 3 Drawing Figures

3,856,569

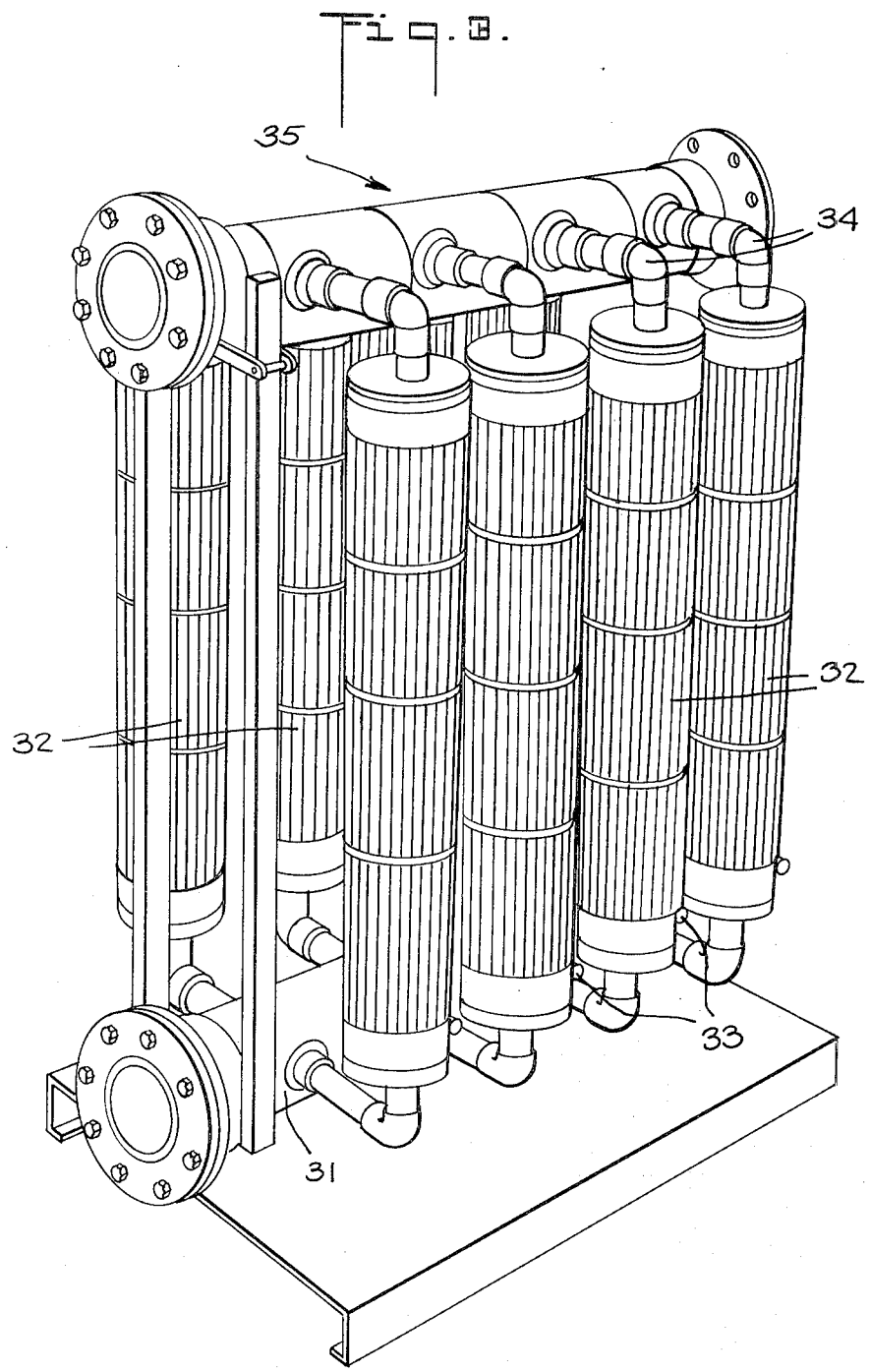

PROCESS FOR THE PURIFICATION AND CONCENTRATION OF SOLUTIONS DERIVED FROM MARINE ALGAE

INTRODUCTION

The invention relates generally to an improved process for the purification and concentration of dilute aqueous solutions derived from marine algae, particularly extract solutions derived from such algae. The process is particularly applicable to the more common, commercial, extracts of marine algae of the class Rhodophyceae such as carrageenan and furcellaran, together with other similar galactans such as phyllophoran, iridophycan, hypnean, and porphyran and of the class Phaeophyceae such as alginates. It is equally applicable to aqueous solutions of derivatives of alginic acid for example salts, such as sodium, potassium or ammonium alginates, or esters of alginic acid such as the propylene glycol esters thereof.

Carrageenan is the name given to the mixture of water soluble galactan sulfate esters, or mixtures of polysaccharide sulfate salt complexes, found in certain species of marine plants of the class Rhodophyceae, typical examples of which are: *Chondrus crispus, Gigartina stellata, Gigartina radula, Eucheuma striata,* and *Eucheuma cottonii.*

Furcellaran (the extract of the seaweed *Furcellaria fastigiata*) is a sulfated galactan similar to carrageenan, except that it has a lower sulfate to galactose ratio. The sulfate content of furcellaran is in the range 12 to 16 percent compared with 20 to 36 percent for carrageenan.

The seaweed extracts phyllophoran, iridophycan, hypnean and porphyran are galactans, similar to carrageenan and/or, furcellaran, with slight variations in structures, sulfate contents and properties. These polysaccharides are extracts respectively of *Phyllophera membranifolia, Iridaea cordata, Hypnea musciformis,* and *Porphyra umbilicalis.*

Alginates such as sodium, potassium and ammonium alginates and other derivatives of alginic acid, for example, propylene glycol alginate, are extracts of marine algae of the class Phaeophyceae, typical examples of which are: Laminaria species, *Ascophyllum nodosum, Macrocystis pyrifera* and *Fucus vesiculosus.*

It is to be understood that in this specification and in the accompanying claims the terms "seaweed" and "marine algae" are substantially interchangeable.

A distinguishing feature of the above polysaccharides, apart from their ability to form aqueous gels, is the high viscosities of their aqueous solutions, even at fairly low concentrations. This property presents some problems in the various aqueous process used for their extraction, particularly in the separation of insoluble, highly hydrated, seaweed residues from the viscous extracted seaweed slurries.

In order to achieve efficient solids separation, and to obtain maximum yields of polysaccharides, extractions are generally carried out at low concentrations of seaweed, in most cases in the order of 2 to 5 percent by weight of original dry seaweed.

The methods of extraction of the class Rhodophyceae used in the art, vary somewhat, but in general, they consist of cooking the seaweeds in hot, or boiling, water for various periods of time. In most cases, it is usual to add various quantities of alkali to the extraction slurry. The alkali most frequently used, because of its low cost and relative insolubility, is calcium oxide, or hydroxide. The function of the alkali is to modify the properties of the polysaccharides, and in particular, to increase milk, or protein, reactivity, and aqueous gel strength (as described in Example V below). The resulting extract slurries are centrifuged and/or filtered to remove insoluble materials, and dilute, clarified, extract solutions are obtained.

There are many variations in the above process, in particular, for carrageenan extraction. For example, U.S. Pat. Nos. 2,620,335 and 3,280,102 disclose that some improvements in the properties of carrageenan products are obtained by treating the seaweed, prior to extraction, or seaweed extract solutions, with various salts, or mixtures of salts, and in particular sodium and/or potassium salts. Improvements in carrageenan solution viscosity, and aqueous gel strength, result from these treatments. It is evident that whichever process is used, the resulting dilute extract solution will contain either some, or all, of the sodium and/or potassium salts used.

The above processes are only two illustrations of the many used in the art. A common feature however of all extraction processes is that a very dilute seaweed extract solution is obtained, i.e., containing from 1 to 2 percent by weight of polysaccharide. In addition to the polysaccharide, the extract solutions will also contain colored impurities, low molecular weight organic compounds, and inorganic salts found naturally in the seaweeds. In the case of a straight-forward extraction process, in which the only impurity, added intentionally, is that of dissolved calcium hydroxide, or calcium salts resulting from neutralization of the solutions, the levels of impurities are in the order of approximately 0.3 to 0.4 percent by weight. (In the case of the patented processes referred to above, the concentrations of impurities could be very much higher). Although these concentrations are quite low, they are quite high relative to the concentration of polysaccharide. If we consider an extract solution containing 2 percent of polysaccharide and 0.3 percent of impurities (the minimum concentration), the direct drying of such a solution, using for example, drum dryers would yield the polysaccharide less than 90 percent pure with a poor color.

An examination of the state of the art reveals many methods by which a reasonably pure, dry product is recovered from an impure, very dilute solution. Methods used to improve both the resulting products, and the economics of the processes, vary depending on the various seaweed extracts. In order to provide the background of the new and improved process of the present invention it is desirable to discuss briefly the advantages and disadvantages of the prior art methods.

In the production of dry polysaccharides from the dilute seaweed extract solutions, two basic methods are employed, namely drum drying, and alcohol precipitation. From economic considerations, and simplicity of the process, drum drying appears to be the most favorable process. However, the products obtained are impure and colored. It is also apparent that with a 2 percent solution, almost 49 lbs. of water must be evaporated per lb. of dry product. In addition to this cost, a great deal of difficulty is experienced in removing the strongly-adhering thin films of product formed on the dryer rolls. Prolonged contact of the product with the dryer roll results in thermal degradation, and eventual charring. Solutions may be concentrated in multi-stage vacuum evaporators, to 3 or 3.5 percent (the maximum concentrations which may be obtained efficiently by this method). Such solutions yield thicker, more easily removable dry films at lower cost. Film removal still presents some difficulty in spite of the higher concentrations, and parting agents, such as glyceryl monolaurate added at a level of approximately 0.2 lb. per 100 lb. solution, are used to obtain better release of the dry films.

Improvement in color and purity is achieved by treatment of the extract solutions with decolorizing agents such as activated charcoal, or with anion exchange resins (Canadian Pat. No. 557,381). These processes are effective, but costly. One disadvantage of the charcoal treating process is that on occasion, for some unknown reason, the charcoal becomes peptized, and can no longer be removed by filtration. The resulting solutions, and products thus become quite dark in color.

Alcohol precipitation gives the purest product since a large proportion of the color, and other impurities, remain dissolved in the alcoholic solution. However, the precipitates obtained are highly solvated and occlude a certain quantity of the impurities present in the original extract solution. When the precipitates are dehydrated with further quantities of alcohol, some of the impurities are insoluble and remain in the precipitated products. In most cases, the precipitates are light tan to tan in color, and of 90 to 95 percent purity. The more water soluble derivatives of carrageenan, i.e., sodium, potassium or ammonium derivatives formed by ion exchange (of the natural cation, calcium, associated with carrageenan), require larger quantities of alcohol for precipitation, and under these circumstances, contamination of the products results from coprecipitation of color bodies and impurities.

For furcellaran production the above remarks apply, but there have been some alternate processes employed, in particular, potassium chloride precipitation techniques. One use of furcellaran is in milk formulations where the useful property of milk reactivity is utilized. The milk reactivity, as described in Example V below, is due to a particular fraction present in the crude furcellaran extract. This fraction is known as -furcellaran, and is distinguished from the other fraction, λ-furcellaran, by being insoluble in solutions of potassium chloride. The furcellaran extract solution is extruded into a bath containing potassium chloride solution. A filamentous precipitate of -furcellaran is formed and may be washed in further solutions of potassium chloride, then oven dried. The λ-furcellaran fraction remains dissolved in the solutions, together with color bodies, and other impurities. This process is rather expensive due to the large usage of potassium chloride since the solutions have to be changed periodically. Alcohol-precipitated furcellaran, if used in slightly larger quantities than the -furcellaran, will produce the same effect in milk. The color however may not be as good.

The other extracts of marine algae of the class Rhodophyceae such as phyllophoran, iridophycan, hypnean and porphyran are similar in properties to carrageenan and furcellaran. In general, the statements made above regarding the extraction and drying processes of carrageenan, and/or furcellaran, are applicable to these other extracts.

For the production of alginates from marine algae of the class Phaeophyceae the conventional process is one of aqueous alkaline extraction of the insoluble alginic acid from acid-treated algae. Calcium alginate is insoluble and the preferred alkali is sodium carbonate which produces a viscous extract solution of sodium alginate even when dilute. Because of the difficulty in separating insoluble algal residues from the viscous extract solution, the concentration of sodium alginate is usually of the order of 1 depolymerized percent or less depending on viscosity. Since alginates are deplymerized at high temperatures, extractions are normally carried out at temperatures not over 40°C. After separation of insoluble algal residues, the extract solution may be decolorized using, for example, activated charcoal, or bleaching agents such as hypochlorites or chlorine. The product may then be recovered from the very dilute solution by alcohol precipitation. Alternatively, purification may be accomplished to some extent by acidifying the solution to a pH of approximately 3 and separating the highly-hydrated, gel-like precipitate of alginic acid. The precipitate may be water-washed to remove excess acid, impurities, etc., then neutralized with an appropriate alkali to give the sodium, potassium, or ammonium salt. If the alkali is added as a solid, or concentrated solution, this purification stage also acts as a concentration stage. The dry product is usually recovered by alcohol precipitation or dehydration.

DESCRIPTION OF THE PRIOR ART

Ultrafiltration membranes, techniques and equipment suitable for use in practising the present invention are well-known in the art, being described for example in the following prior art references:

| United States Patents | British Patent |
| --- | --- |
| 3,488,768 | 1,091,432 |
| 3,491,021 | |
| 3,508,994 | |
| 3,539,155 | |
| 3,541,006 | |
| 3,549,016 | |
| 3,556,302 | |
| 3,556,305 | |
| 3,556,992 | |
| 3,560,377 | |
| 3,565,256 | |
| 3,567,031 | |
| 3,567,377 | |
| 3,567,810 | | and in such Amicon publications as Nos. 1008A and 1010 referred to hereinafter.

U.S. Pat. Nos. 3,541,006; 3,549,016; and 3,567,810 cited above disclose the ultrafiltration of aqueous solutions of certain polysaccharides, namely materials known as "dextrans" which are neutral polymers of glucose having chain-like structures and very high molecular weights (up to 200,000 or higher) produced from sucrose by fermentation procedures, typically using Leuconostoc bacteria. Dextrans contain no sulfate or uronic acid groups and are incapable of forming salts. In these and other respects dextrans are very unlike the polysaccharides, typified by carrageenans and alginates present in the aqueous extracts from marine algae processed according to the present invention. Although ultrafiltration techniques have been known for some time, so far as applicant is aware prior to the present invention, with the exception of the U.S. Pat. No. 2,128,551 issued Aug. 30, 1938 in the name of Le Gloahec, et al., discussed below, it never occurred to those skilled in the art to which the present invention relates that it would be possible to recover such polysaccharides in an expeditious and advantageous manner by the application of ultrafiltration.

The Le Gloahec, et al., patent teaches (page 6, column 2, lines 41–45) concentration of a clarified alginous solution by "ultra-filtration on a septum the size of the pores of which must range between 0.5 and 1 micron." This is in distinct contrast to applicant's ultrafiltration using a semi-permeable membrane having an apparent pore diameter of from 20 to 400 Angstrom units which range corresponds to a range of from $2 \times 10^{-3}$ (0.002) micrometer (micron) to $4 \times 10^{-2}$ (0.04) micrometer (micron). As will be seen from the instant disclosure and especially from Example IV, which shows a range of pore size for a microporous filter medium approximating the range shown as required by Le Gloahec, et al., use of a pore size range as taught by Le Gloahec et al allows a significant loss of valuable polysaccharide through the filter medium. It also results in significant degradation of the polysaccharide molecule. Neither of these undesirable consequences occur when an ultrafiltration membrane with an apparent pore size of 20 to 400 Angstrom units is employed.

SUMMARY OF THE INVENTION

The invention is a method of purifying and concentrating aqueous polysaccharide solutions derived from marine algae typified by the classes Rhodophyceae and Phaeophyceae which comprises subjecting the aqueous polysaccharide solution to ultrafiltration and thereby selectively separating water and low molecular weight species contained in the solution from the polysaccharide. The ultrafiltration is carried out with well-known ultrafiltration equipment. The solution inlet pressure is generally at least 10 pounds per square inch gauge and preferably from 80 to 100 p.s.i.g. while the solution outlet pressure, which must be lower than the inlet pressure, generally ranges from 0 to 100 p.s.i.g. and preferably from 0 to 20 p.s.i.g. The solution temperature preferably ranges from 60° to 100°C. and more preferably ranges from 80° to 100°C. for extracts of algae of the class Rhodophyceae, and preferably ranges from 20° to 40°C. and more preferably ranges from 30° to 40°C. for extracts of algae of the class Phaeophyceae. The pH of the solution if typically between the usual pH of the extract solution, i.e., 11 to 12, and 6.5 and preferably ranges from 6.5 to 8.5.

Since aqueous solutions of esters of alginic acid, such as the propylene glycol ester, frequently contain free carboxyl groups as a result of incomplete esterification, the pH of such solutions may be significantly lower than 7, for example as low as 3.5 to 4.

In the case of extracts of marine algae of the class Rhodophyceae, a preferred method of carrying out the invention where the initial aqueous polysaccharide extract solution contains the polysaccharide as a calcium derivative comprises subjecting the solution to ion exchange so as to replace the calcium moiety of the polysaccharide with a moiety selected from the group consisting of potassium, sodium and ammonium. The resulting solution of the potassium, sodium or ammonium derivative is then subjected to ultrafiltration in accordance with the invention. A preferred method of effecting the ion exchange consists of adding potassium, sodium or ammonium carbonate to the calcium derivative solution in amount equivalent to or somewhat less than the calcium content of the solution, after which the precipitated calcium carbonate thereby formed is separated from the solution by conventional separating means such as ordinary filtration, after which the resulting solution is subjected to the ultrafiltration. Instead of using a single potassium, sodium or ammonium carbonate, mixtures of two or all three can be employed.

In practice, it is preferred to carry out the ultrafiltration until a point is reached at which circulation of the polysaccharide solution becomes difficult due to the elevated viscosity of the solution at the high polysaccharide level achieved. The concentrating process can be continued to this point in any suitable way as by feeding the polysaccharide solution formed in the first ultrafiltration unit to a second ultrafiltration unit, and so on. Alternatively, a single ultrafiltration unit can be employed with recirculation of the concentrate to the initial solution reservoir after which it is again subjected to the ultrafiltration.

In the typical practice of the invention a polysaccharide solution having an initial concentration of from 1 to 3 percent by weight is subjected to ultrafiltration until a concentration of from about 6 to 8 percent by weight is achieved. If desired, further purification of the relatively concentrated polysaccharide solution obtained by ultrafiltration in accordance with the invention can be accomplished by diluting the concentrated solution with water and then re-concentrating the dilute solution by ultrafiltration. Alternatively, such further purification can be achieved by addition of fresh water to the concentrate at a rate corresponding to that at which water is being removed in the ultrafiltrate by the ultrafiltration.

BRIEF DESCRIPTION OF THE DRAWINGS

In the accompanying drawings:

FIG. 3 is a perspective view of a modular thinchannel ultrafiltration unit of a type which is eminently suitable for use in the practice of the invention and which is readily available commercially.

DESCRIPTION OF THE PREFERRED EMBODIMENTS

Figure 1:
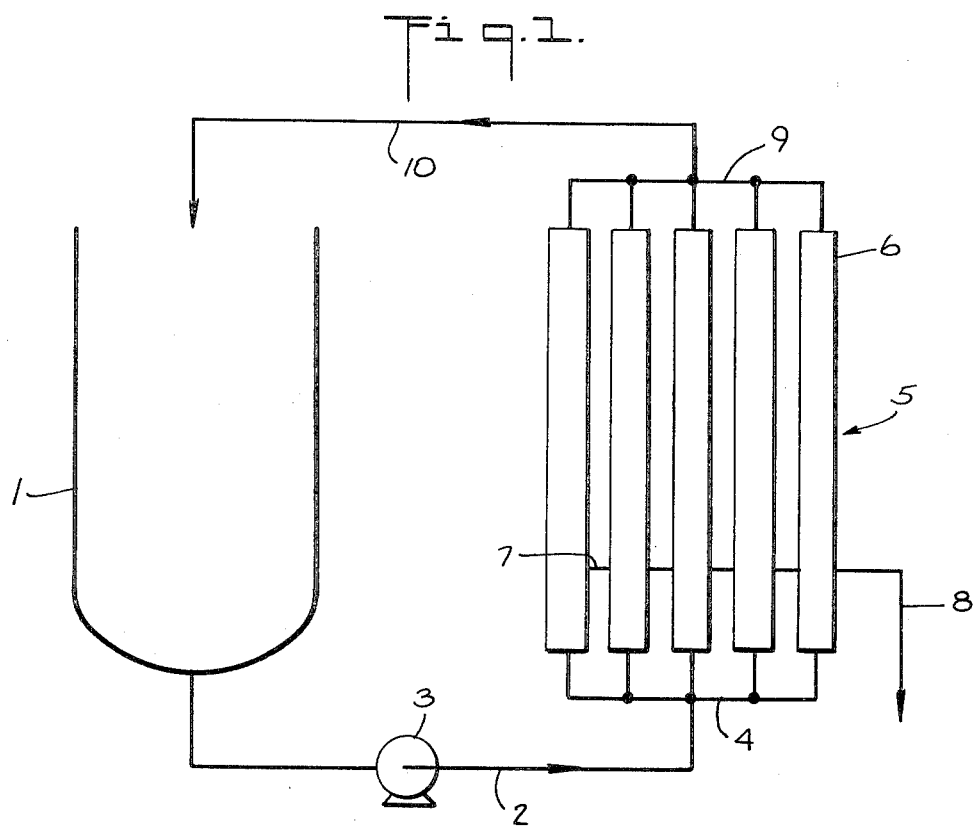
FIG. 1 is a schematic representation of equipment used in a batch process for conducting ultrafiltration of aqueous seaweed extracts in accordance with the present invention.

The present invention is a significantly improved method for concentrating the polysaccharide solutions. In addition to concentration, the solutions are purified so that a purified concentrate of the polysaccharide may be obtained. The process of the invention is based on the discovery that these polysaccharide solutions can be concentrated and simultaneously purified by subjecting them to ultrafiltration whereby water and low molecular weight entities in the solution are caused to pass through the filter medium or membrane of the ultrafiltration equipment and to emerge as ultrafiltrate while the desirable polysaccharides are retained by the membrane or the like and recovered in concentrated form.

The term "ultrafiltration" is used herein in its accepted meaning as defining a process of selective molecular separation of liquid solutions into fractions employing semi-permeable membranes which permit passage of solvent and solutes of low molecular weight under the influence of an applied pressure, typically of the order 10 to 100 pounds per square inch gauge, while solutes and colloidal matter having molecular dimensions larger than the membrane pores are retained. Thus species below the membrane cut-off level emerge as "ultrafiltrate" and retained substances are progressively concentrated upstream.

The term "membrane ultrafiltration," which is synonymous with ultrafiltration, is defined in an article by Porter, et al., in Chemical Technology for January, 1971 at page 56. The term usually denotes a continuous separation process in which a solution under pressure flows over the surface of a supported membrane and under the impressed pressure gradient across the membrane solvent and smaller solute species pass through the membrane and are collected as permeate. Larger solute species are retained by the membrane and recovered as a concentrated retentate. The apparent pore diameter of the ultrafiltration membranes is usually from about 20 A (Angstrom units) ($2 \times 10^{-3}$ micron) up to 400 A ($4 \times 10^{-2}$ micron) and it is applied for the separation of solutes usually having molecular weights greater than 500. However, this molecular weight limit is further complicated by molecular shape which bears no fixed relationship to molecular weight. If the molecules have the same molecular weight but one is long, slender and flexible where the other is ball-like, the long slender molecule can find its way through a smaller hole (pore) than the ball-like one. In summary then, ultrafiltration is a technique for selectively filtering large molecules from solutions according to their size and shape.

In practising the present invention a feed stream of the polysaccharide solution derived from marine algae is pressurized (between 10 and 100 p.s.i.g.), and passed over a suitably supported ultrafiltration membrane. Water and molecules whose dimensions are smaller than the membrane pores (cutoff level) pass through the membrane to emerge as ultrafiltrate. The desired polysaccharides are retained by the membrane and are progressively concentrated as the process is continued. Thus there is concentration of the polysaccharide without concentration of the much lower molecular weight colored compounds, organic and inorganic impurities. This process does not involve a phase change, nor interphase mass transfer. The pressures involved are fairly low and thus pumping and equipment costs are low. The process is simple to operate and constitutes a considerable advance in processing polysaccharide solutions derived from marine algae.

The ultrafiltration process is capable of concentrating marine polysaccharide solutions, containing initially about 2 percent polysaccharide, to solutions containing perhaps as high as 10 percent polysaccharide. If the initial solution contains about 0.3 – 0.4 percent impurities, direct drying of this solution would give a product containing approximately 13–17 percent impurities. However, by ultrafiltration in accordance with the invention, these low molecular weight impurities pass through the ultrafiltration membrane at essentially the same rate as water and therefore are not concentrated in the extract solution. These concentrated extracts would ultimately contain 10 percent polysaccharide in a solution still containing 0.3 – 0.4 percent impurities. Direct drying of this solution will give a product containing approximately 2.5 – 3.5 percent impurities. Thus, the present invention effects a substantial improvement in purity of product and in addition, the quantity of water to be removed in any subsequent drying process has been reduced from approximately 49 lb. water per lb. of dry product, to approximately 9 lb. water per lb. dry product, a very significant reduction.

The process of the invention is capable of giving products of even greater purity. For example, if the concentrated solution is diluted with fresh water, and then reconcentrated by ultrafiltration, it is possible to obtain a polysaccharide solution which is almost completely free from impurities, particularly if the dilution and reconcentration process is repeated one or more times. Alternatively, fresh water may be added to the concentrated solution at the same rate at which water, together with low molecular weight species, is being removed from the solution by ultrafiltration. If this is continued long enough, virtually complete purification may be achieved.

As with every process, the ultrafiltration process has its limitations and disadvantages. The seaweed extract solutions, as produced, are fairly viscous and on concentration become even more so, even at the elevated temperatures, i.e., near to boiling point, typically employed in the process as applied to extracts of the class Rhodophyceae. At elevated concentrations, and hence viscosities, not only do the solutions become progressively more difficult to pump, but the ultrafiltration flux rate (the rate at which water passes through the membrane per sq. ft. of membrane area, usually denoted G.F.D. or gallons per sq. ft. per day) decreases, and to obtain very high concentrations, the membrane area required may become rather excessive. A balance has to be made therefore, between membrane area and maximum concentration required. Reasonable flux rates may be obtained for polysaccharide concentrations of as high as about 8 percent, or possibly slightly less for high viscosity products, and this is regarded as being a reasonable, practical, limit. Further concentration, i.e., up to 10 percent or so, only reduces evaporation requirements approximately 2 lb. water per lb. dry product, and may not justify the extra membrane area required.

The selection of ultrafiltration membranes is important in view of the operating conditions, i.e., high temperatures (typically employed in the application of the invention to extracts of the class Rhodophyceae), with pH 7 to 8.5 or possibly higher. In addition, the selection of equipment in which the membranes can perform at their maximum efficiency in terms of flux rate is important. One company which manufactures ultrafiltration membranes and equipment which satisfy these requirements, and which has supplied most of the equipment used for the experimental work described in this disclosure, is the Amicon Corp. of 21 Hartwell Avenue, Lexington, Mass. 02173, U.S.A. While this company has patented the operating principles and features of its membranes and equipment, it has not heretofore been proposed to use ultrafiltration techniques for the processing of marine algae extracts. Several different ultrafiltration membranes are available which differ mainly in their ability to retain high or low molecular weight species. In making a choice between the various membranes, it is preferable to choose the one which will just retain the polysaccharide molecule and allow the passage of only slightly smaller molecules. This membrane will give higher flux rates than the "tighter" membranes which retain smaller molecules. Suitable Amicon membranes are denoted PM10 and PM30. The numbers 10 and 30 refer to molecular weight retentions of 10,000 and 30,000, respectively.

An unexpected feature, discovered in connection with the aqueous polysaccharide solutions derived from marine algae, is that there is retention of the polysaccharides by microporous filter media, such as those produced by the Millipore Corp., Ashby Road, Bedford, Mass. 01730, U.S.A. These filters will normally retain only solid particulate materials, but it has been found, in accordance with the invention, that the polysaccharides are retained also. The degree of retention depends on the filter pore size and the material from which the filter is made. Since the degree of retention of the polysaccharide is only in the order of approximately 80 percent or less, and there is some degradation of the polysaccharide molecule, the true ultrafiltration membranes are preferred, i.e., the membranes PM10 and/or PM30, or those having similar performance manufactured by another company. In a recent article it has been suggested that polysaccharides such as carrageenan form a spiral structure in which the solvent molecules, i.e., water, are bound up thus forming extremely large molecules.

In another aspect of the invention a method has also been found whereby the efficiency of the ultrafiltration process may be improved by an increase in the flux rates obtainable. As outlined earlier, the methods of extraction of marine algae of the class Rhodophyceae usually include the use of calcium oxide, or hydroxide, to modify the properties of the resulting extracts. The extracts obtained are associated with various cations, or mixtures of cations, and even without the calcium hydroxide treatment, the predominating cation is usually calcium. Such products are therefore termed calcium carrageenate, calcium furcellaran, etc. This may not always be the case. If, for example, the seaweeds are washed with various salt solutions before extraction, or if the extraction is carried out in solutions of other alkalis, some degree of ion exchange will occur.

From an economic point of view, if polysaccharides in which the predominant cation is sodium, potassium, ammonium, etc., are required, it is more satisfactory to carry out the extraction of polysaccharides from marine algae of the class Rhodophyceae, and alkali modification of the extract, in the presence of the cheaper calcium hydroxide which is afterwards removed in the filtration process. The resulting extract may then be ion exchanged to give the desired product.

In general, the properties of the ion exchanged polysaccharides are similar to the calcium derivatives except for water solubility. The calcium derivatives of, for example, carrageenan and furcellaran, dissolve only in hot water; the sodium, potassium and ammonium forms dissolve in cold, or possibly just warm, water. This increase in solubility may be useful in the manufacture of formulations containing the polysaccharide where heat is undesirable, its for example, in the process shown in Canadian Pat. No. 870,000, in which cold water-soluble sodium carrageenate is used as an ingredient in a water dessert gel formulation. A disadvantage however in manufacturing polysaccharides, in which the predominant cation is other than calcium, is the cost of chemicals involved, unless the extra cost can be justified in the end use of the product, or in some processing advantage.

In the ultrafiltration of calcium carrageenanate solutions, calcium furcellaran solutions, etc., the flux rates drop fairly significantly with increase in polysaccharide concentration. For example, the reduction in flux rate, in doubling the concentration, may be as much as 50 percent. If however, in accordance with a preferred method of practicing the invention as applied to extracts of the class Rhodophyceae, the calcium polysaccharide is ion exchanged to give either the sodium, potassium, or ammonium form, there is a considerable increase in flux rate, (other conditions such as temperature and pressure being equal). The increase is such that for a solution containing initially about 2 percent of the polysaccharide, the solution concentration may be doubled whilst the resulting flux rates are similar to, or even greater than, the initial flux rate of the calcium polysaccharide solution. Utilization of this effect leads to significant savings in membrane area requirements in a given process, and may be regarded as a significant improvement in the basic process of the invention.

This increase in flux rate has been demonstrated by addition of either sodium, potassium, or ammonium carbonates to the calcium derivative solution during the ultrafiltration process. Ion exchange takes place with the precipitation of insoluble calcium carbonate and is accompanied by an increase in the ultrafiltration flux rate. This increase in flux rate is believed to be due to a reduction in solution viscosity, which is known to occur when other soluble salts, e.g. sodium and/or potassium chloride, are added. These chlorides may be equally as effective as the carbonates, except that, depending on the quantities of salts used, the ion exchange may be incomplete, and the polysaccharide products will be partially contaminated with the added salt. The precipitate of calcium carbonate formed by adding soluble carbonates to the calcium polysaccharide solutions may be removed by conventional filtration prior to the ultrafiltration stage. If a quantity of carbonate equivalent to the calcium content of the solution is added, virtually complete ion exchange will take place without the presence of the added carbonate as an impurity. The quantity of carbonate required may be determined by noting the increase in ultrafiltration flux rate as the carbonate is added to a given quantity of the polysaccharide solution. It has been found that the increase in flux rate is at a maximum when the equivalent quantity of carbonate has been added. Further addition apparently has little or no effect, and thus this aspect of the process can be used as a means of determining the calcium content of the polysaccharides with a reasonable degree of accuracy.

The ultrafiltration process may be carried out under various conditions of temperature, pressure, and flow rates. It has been determined that the conditions which give the highest flux rates, and hence the most efficient process, are temperatures as high as possible without thermal degradation of the polysaccharides, and solution inlet pressures, to the ultrafiltration module, as high as possible, i.e., typically at least 10 p.s.i.g., and preferably 80–100 p.s.i.g. Solution outlet pressures from the ultrafiltration module should be low, thus giving high solution velocities across the ultrafiltration membrane surfaces. Typically the solution outlet pressure ranges from 0 to 100 p.s.i.g., preferably ranging from 0 to 20 p.s.i.g. While these conditions are preferred, they are not intended to limit the scope of the invention. Inlet and outlet pressures may be anywhere in the range of 0–100 p.s.i.g. or even higher if the equipment is capable of withstanding the higher pressures. Temperatures may range, from the solution boiling point to the lowest temperature at which the solutions are sufficiently fluid, but preferably range from 80° to 100°C. for extracts of marine algae of the class Rhodophyceae and 25° to 40°C. for the heat-sensitive extracts of marine algae of the class Phaeophyceae.

Referring to FIG. 1 of the drawings, which portrays a batch process for purifying and concentrating marine algal extracts in accordance with the invention, the solution reservoir 1 is charged with a batch of extract solution. The solution is circulated by line 2 and pump 3 into inlet manifold 4 of an ultrafiltration unit 5 which in accordance with well-known practice consists of the required number of ultrafiltration modules or cartridges 6, arranged in parallel, to give the necessary ultrafiltration membrane area. The ultrafiltrate exits the cartridges via outlet tubes, indicated by reference numeral 7, which pass it to waste line 8. The ultrafiltration concentrate exits the modules or cartridges 6 via outlet manifold 9 and is returned via line 10 to reservoir 1. Circulation is continued until the desired solution concentration has been achieved.

Ultrafiltration unit 5 can be of well-known type, such as the modular ultrafiltration unit shown in Publication No. 1008A and Publication No. 1010 of Amicon Corporation, both dated 1971 and entitled, respectively, "Industrial Ultrafiltration Systems" and "Thin-Channel Ultrafiltration Systems for Dewatering and Purification of Electrocoating Paints." These publications are incorporated herein by reference. This particular modular unit comprises eight thin-channel modules (disposable cartridges) in parallel, each module having a membrane area originally of 10 ft.$^2$, since increased to 14 ft.$^2$ giving a total membrane area of 112 ft.$^2$, and is depicted in FIG. 3 of the drawings.

Figure 2:
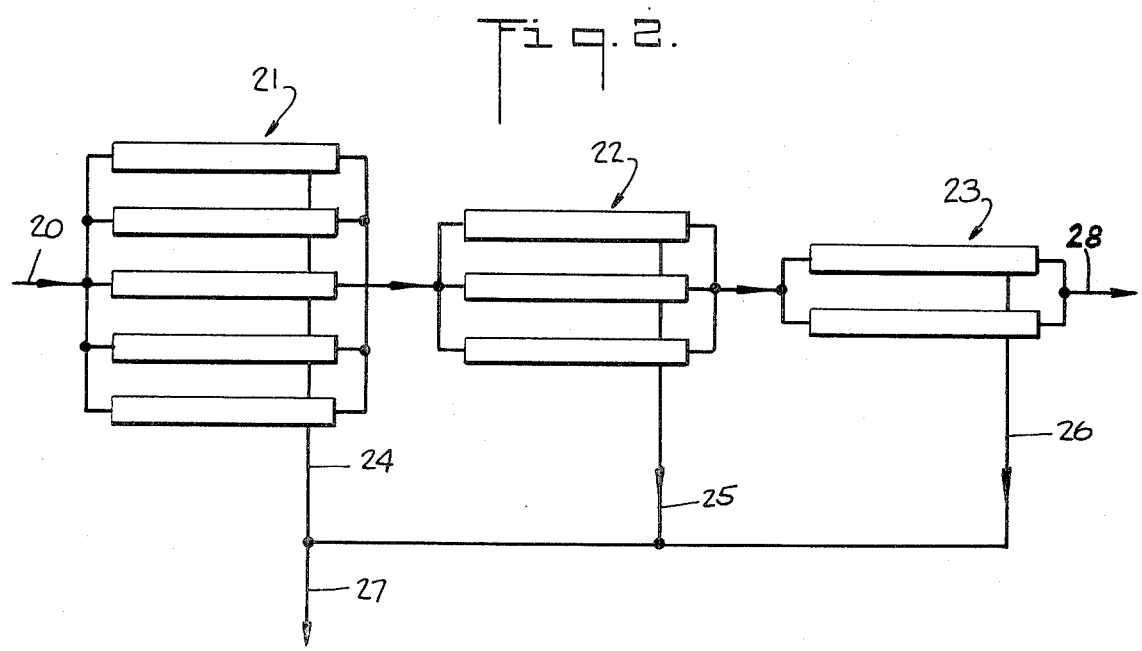
FIG. 2 is a schematic representation of equipment for carrying out such a process in a continuous manner.

In a continuous process of practicing the invention, sufficient membrane area is provided so that when the solution is pumped through a series of ultrafiltration units, it emerges at the concentration desired for the drying stage. Referring to FIG. 2, this can be accomplished by feeding the seaweed extract solution continuously into the equipment through inlet 20 and successively through ultrafiltration units 21, 22 and 23 having successively smaller membrane areas. The ultrafiltrate exits the units via lines 24, 25 and 26 and thence via line 27 to waste. The concentrate leaves the final ultrafiltration unit 23 via line 28.

The batch process has some advantages over the continuous process in that (a) membrane area requirements for the batch process are slightly less, (b) the batch process is a little easier to operate and (c) fewer pumps are required for the batch process.

Referring to FIG. 3, the solution to be purified and concentrated enters solution inlet manifold 31 and thence passes under pressure through the eight parallel ultrafiltration modules 32 each of which is a linear thin-channel ultrafiltration cartridge incorporating hundreds of thin channels and large membrane areas of the type described in Amicon Corporation Publication No. 1010 cited above. The ultrafiltrate leaves the modules 32 via outlet tubes 33 located at the base of the modules. The concentrated solution passes via outlet lines 34 into the solution concentrate manifold 35 whence it is recirculated or passed to a succeeding modular ultrafiltration unit (as shown in FIG. 2).

The following examples further illustrate various specific features of the present invention but are intended in no way to limit the scope of the invention which is defined in the appended claims.

EXAMPLE I

Three l of a cold, 2.6 percent, filtered, solution of carrageenan neutralized to pH 8 to 8.5, and prepared by extraction of *Chondrus crispus*, in the presence of calcium hydroxide, was contained in the solution reservoir of a laboratory scale ultrafiltration unit, fitted with a 40 inch long, tubular ultrafiltration module supplied by the Amicon Corp. and containing a PM30 ultrafiltration membrane.

The cold, viscous solution was pumped, at a pressure of 80 p.s.i.g., through the ultrafiltration tube with complete recirculation of the carrageenan solution, and ultrafiltrate, back to the solution reservoir. The flux rate under these conditions was determined by measuring the quantity of ultrafiltrate collected over a timed period. The temperature of the recirculating solution was then increased, with determination of flux rate at various temperatures. The inlet pressure to the ultrafiltration tube was maintained constant throughout the experiment, at 80 p.s.i.g. The outlet pressure increased as the solution temperature increased, due to an increase in recirculation rate as a result of lower solution viscosities. The results obtained are shown below in Table I.

TABLE I

| SOLUTION TEMPERATURE °C | | PRESSURES p.s.i.g. | | FLUX RATE G.F.D. (Gallons/ft$^2$/day) |
|---|---|---|---|---|
| Inlet | Outlet | Inlet | Outlet | |
| 25 | 25 | 80 | 0 | 5.8 |
| 30 | 30 | do. | do. | 6.1 |
| 35 | 35 | do. | do. | 6.5 |
| 40 | 40 | do. | do. | 7.0 |
| 46 | 45 | do. | 2 | 7.8 |
| 52 | 50 | do. | 4 | 8.9 |
| 62 | 60 | do. | 10 | 11.9 |
| 67 | 67 | do. | 40 | 14.5 |
| 78 | 75 | do. | do. | 16.8 |
| 90 | 85 | do. | 45 | 20.0 |
| 90 | 85 | do. | 35 | 20.9 |

The results obtained in this experiment clearly demonstrate the increase in ultrafiltration flux rate as a result of temperature increase. It is quite obvious therefore that the process of the invention is more efficient at the higher temperatures.

EXAMPLE II

A quantity of *Chondrus crispus* was extracted, in the presence of calcium hydroxide, to obtain a quantity of filtered, neutralized, carrageenan solution. To a small, weighed portion of this solution, alcohol was added to precipitate the carrageenan which was dried, and weighed to determine the concentration of carrageenan in the solution.

Three l of the solution was placed in the solution reservoir of the ultrafiltration unit and heated, by means of a boiling water bath, to 89°C. The solution was then ultrafiltered with recycle of the carrageenan solution to the reservoir, but separate collection of the ultrafiltrate in a measuring cylinder. Flux rate determinations were carried out as ultrafiltrate was collected, and at increasing concentrations of the carrageenan solution. At various carrageenan concentrations, calculated from the quantity of ultrafiltrate collected, the inlet pressures were varied between 60 and 80 p.s.i.g. and the flux rates, at these pressures, determined. Outlet pressures and temperatures were kept as constant as possible, however, as the solution concentration, and therefore viscosity, increased, there was an unavoidable decrease in outlet temperatures due to heat losses in the system, and lower recirculation rates. The results obtained are shown in Table II.

The results which appear in Table II clearly indicate the advantage of the higher inlet pressures, in terms of increase in flux rate. There is also an almost threefold increase in carrageenan concentration and further concentration is possible. While the flux rates at the higher concentrations are low, the quantity of ultrafiltrate which has to be removed, to further increase the concentration, is small. For example, in concentrating a 2 percent solution to 4 percent, 50 percent of the water has to be removed, however, in a further increase in concentration of 2 percent, from 4 to 6 percent, only 17 percent, of the original solution volume, of water has to be removed, and so on. The original carrageenan solution used in the experiment was gold colored. During the ultrafiltration, the ultrafiltrate was the same color as the original solution, and the final concentrated carrageenan solution was unchanged in color, showing that there had been no concentration of color bodies during the process.

EXAMPLE III

An experiment similar to that described in Example II was carried out except that the solution pressures on the outlet side of the ultrafiltration tube were varied, in addition to varying the inlet pressures. The results obtained are shown in Table III.

TABLE II

| SOLUTION TEMPERATURE °C | | PRESSURES p.s.i.g. | | FLUX RATE G.F.D. (Gallons/ft²/day) | CARRAGEENAN CONCENTRATION % by wt. |
|---|---|---|---|---|---|
| Inlet | Outlet | Inlet | Outlet | | |
| 89 | 85 | 80 | 13 | 18.7 | ) |
| do. | do. | do. | 33 | 16.5 | ) 2.33 |
| do. | do. | 70 | 13 | 15.7 | ) |
| do. | do. | 60 | do. | 12.7 | ) |
| do. | 83 | 80 | do. | 14.9 | ) |
| do. | do. | 70 | do. | 12.7 | ) 2.86 |
| do. | do. | 60 | do. | 11.4 | ) |
| do. | 84 | 80 | do. | 14.6 | ) |
| do. | do. | 70 | do. | 12.7 | ) 3.82 |
| do. | do. | 60 | do. | 10.5 | ) |
| do. | 81 | 80 | do. | 13.5 | ) |
| do. | do. | 70 | do. | 11.4 | ) 4.3 |
| do. | do. | 60 | do. | 9.2 | ) |
| do. | 80 | 80 | do. | 10.5 | ) |
| do. | do. | 70 | do. | 8.7 | ) 4.73 |
| do. | do. | 60 | do. | 6.3 | ) |
| 86 | 73 | 80 | do. | 6.0 | ) 6.14 |
| do. | do. | 70 | do. | 4.8 | ) |
| 88 | 75 | 80 | do. | 5.5 | ) 6.48 |
| do. | do. | 70 | do. | 4.3 | ) |
| do. | 74 | 80 | do. | 5.3 | ) 6.84 |
| do. | do. | 70 | do. | 4.1 | ) |

TABLE III

| SOLUTION TEMPERATURE °C | | PRESSURES p.s.i.g. | | FLUX RATE G.F.D. (Gallons/ft²/day) | CARRAGEENAN CONCENTRATION % by wt. |
|---|---|---|---|---|---|
| Inlet | Outlet | Inlet | Outlet | | |
| 86 | 84 | 80 | 0 | 26.7 | ) |
| do. | do. | do. | 10 | 26.2 | ) |
| do. | do. | do. | 20 | 26.0 | ) |
| do. | do. | 70 | 0 | 25.2 | ) 1.94 |
| do. | do. | do. | 10 | 25.0 | ) |
| do. | do. | do. | 20 | 23.7 | ) |
| do. | do. | 60 | 0 | 20.1 | ) |
| 90 | 85 | 80 | 0 | 19.2 | ) |
| do. | do. | do. | 10 | 18.5 | ) |
| do. | do. | do. | 20 | 17.1 | ) 2.71 |
| do. | do. | 70 | 0 | 15.5 | ) |
| do. | do. | 60 | 0 | 14.4 | ) |

The results tabulated in Table III clearly indicate that maximum flux rates are obtained when inlet pressures are a maximum and outlet pressures at a minimum.

EXAMPLE IV

A 15 cm. dia. microporous filter disc having a pore size of 0.45 micrometer (micron) manufactured by the Millipore Corp. was fitted into a laboratory ultrafiltration membrane holder manufactured by the Amicon Corp. Two l of carrgeenan solution were ultrafiltered using the microporous filter as an ultrafiltration membrane. At the end of the experiment, carrageenan was recovered from both the concentrate and the ultrafiltrate by alcohol precipitation, alcohol washed, dried, and weighed. The results of this experiment are shown in Table IV.

TABLE IV

| G.F.D. SOLUTION TEMPERATURE °C | | CARRAGEENAN PRESSURES p.s.i.g. | | FLUX RATE (Gallons/ft²/day) | CONCENTRATION % by wt. |
| --- | --- | --- | --- | --- | --- |
| Inlet | Outlet | Inlet | Outlet | | |
| 89 | 80 | 60 | 0 | 31.25 | 1.92 |
| 90 | 82 | do. | do. | 26.7 | 2.22 |
| 93 | 81 | do. | do. | 14.7 | 2.85 |
| do. | do. | do. | do. | 12.9 | 2.98 |
| do. | do. | do. | do. | 11.6 | 3.16 |
| do. | 79 | do. | do. | 10.1 | 3.33 |
| do. | 77 | do. | do. | 9.3 | 3.52 |
| do. | 76 | do. | do. | 8.5 | 3.68 |
| do. | 78 | 80 | 0 | 9.8 | 3.93 |
| do. | 77 | do. | do. | 9.1 | 4.17 |
| 92 | 75 | do. | do. | 7.8 | 4.68 |
| do. | 74 | do. | do. | 6.75 | 4.95 |

Weight of dry carrageenan recovered from the concentrated solution = 30.4 g
Weight of dry carrageenan recovered from the ultrafiltrate = 6.3 g The results shown in Table IV show that microporous filters may be used for the ultrafiltration of a carrageenan extract solution. Retention of the polysaccharide is not absolute, and there is partial passage of the polysaccharide through the membrane. Similar results have been obtained using other microporous filters with pore sizes ranging from 0.25 micrometer to 0.65 micrometer. These filters are normally used for clarifying solutions containing very fine particulate matter, and are not normally considered ultrafiltration membranes.

EXAMPLE V

A quantity of *Chondrus crispus* was extracted, in the presence of calcium hydroxide, to give just over 10 l of filtered, neutralized (to pH 8 to 8.5), carrageenan extract solution, containing approximately 2 percent of the polysaccharide. This solution was divided into four portions of 2.5. l each, portions A, B, C and D. Each portion was then treated as follows:

Portion A

This portion was ultrafiltered, using a 40 inch tubular ultrafiltration module, fitted with a PM30 ultrafiltration membrane. The ultrafiltration was continued until the volume of the original solution had been reduced by 50 percent, i.e., 1.25 l of ultrafiltrate had been collected. Flux rates were determined for various increases in the quantity of ultrafiltrate collected. These rates are shown in TABLE V(A). The ultrafiltration apparatus was flushed with hot water. The washings, together with a fine filter aid, were added to the concentrated carrageenan solution, and the hot solution filtered. Carrageenan (calcium carrageenate) was recovered from the filtrate by alcohol precipitation, alcohol washed, and dried. There was no carrageenan detected in the ultrafiltrate on alcohol addition. There was a distinct improvement in color of the ultrafiltered carrageenan solution.

Portion B

This portion was treated as closely as possible, and in the same manner, as for Portion A, except that after the flux rate determination at the start of the experiment, 2 g portions of potassium carbonate were added with determination of flux rate until there was no change in flux rate on further addition of the carbonate. During the carbonate addition period, there was complete recirculation of carrageenan solution, and ultrafiltrate to the solution reservoir. At the end of the carbonate addition period, the carrageenan solution was treated as Portion A, i.e., 1.25 l ultrafiltrate was collected, the solution filtered to remove the precipitate of calcium carbonate, and the potassium carrageenate was recovered by alcohol precipitation. Flux rate data for this experiment is shown in Table V(B).

Portion C

This portion was treated as for Portion B, except that ammonium carbonate was substituted for potassium carbonate. Flux rate data obtained in this experiment is shown in Table V(C). Ammonium carrageenate was recovered as in the previous cases.

Portion D

This portion was treated as Portion B, except that in this case sodium carbonate was used. Flux rate data obtained is shown in Table V(D). Sodium carrageenate was recovered as for the products in the previous cases.

TABLE V(A)

| SOLUTION TEMPERATURE °C | | PRESSURES p.s.i.g. | | VOL. ULTRAFILTRATE | FLUX RATE G.F.D. |
|---|---|---|---|---|---|
| Inlet | Outlet | Inlet | Outlet | Collected Mls. | (Gallons/ft²/day) |
| 81 | 81 | 70 | 40 | — | 21.0 |
| 84 | 84 | do. | do. | 100 | 21.7 |
| 88 | 86 | do. | do. | 200 | 22.0 |
| 89 | 87 | do. | do. | 300 | 21.3 |
| 90 | 89 | do. | do. | 400 | 21.0 |
| 91 | do. | do. | do. | 500 | 20.7 |
| 90 | do. | do. | 20 | 1150 | 13.3 |
| do. | 88 | do. | do. | 1250 | 12.9 |

TABLE V(B)

| SOLUTION TEMPERATURE °C | | PRESSURES p.s.i.g. | | VOL. ULTRAFILTRATE | FLUX RATE G.F.D | TOTAL K₂CO₃ |
|---|---|---|---|---|---|---|
| Inlet | Outlet | Inlet | Outlet | Collected Mls. | (Gallons/ft²/day) | Added |
| 86 | 86 | 70 | 40 | — | 19.3 | — |
| 88 | 88 | do. | do. | — | 20.3 | 2 g |
| do. | do. | do. | do. | — | 21.3 | 4 g |
| 89 | 89 | do. | do. | — | 22.3 | 6 g |
| do. | do. | do. | do. | — | 23.3 | 8 g |
| do. | do. | do. | do. | — | 27.0 | 10 g |
| do. | do. | do. | do. | — | 32.0 | 12 g |
| do. | do. | do. | do. | — | 34.0 | 14 g |
| do. | do. | do. | do. | — | 36.0 | 16 g |
| 88 | 88 | do. | do. | — | 35.6 | — |
| do. | do. | do. | do. | 100 | 32.0 | — |
| do. | do. | do. | do. | 200 | 32.0 | — |
| 89 | do. | do. | do. | 300 | 33.0 | — |
| do. | do. | do. | do. | 400 | 30.0 | — |
| do. | do. | do. | do. | 500 | 27.7 | — |
| 88 | 87 | do. | 25 | 800 | 28.7 | — |
| do. | 86 | do. | 20 | 1000 | 24.5 | — |
| do. | do. | do. | do. | 1250 | 21.3 | — |

TABLE V(C)

| SOLUTION TEMPERATURES °C | | PRESSURES p.s.i.g. | | VOL. ULTRAFILTRATE | FLUX RATE G.F.D. | TOTAL (NH₄)₂CO₃ |
|---|---|---|---|---|---|---|
| Inlet | Outlet | Inlet | Outlet | Collected Mls. | (Gallons/ft²/day) | ADDED |
| 82 | 81 | 70 | 40 | — | 22.7 | — |
| 86 | 86 | do. | do. | — | 25.5 | 2 g |
| 86 | 85 | do. | do. | — | 26.7 | 4 g |
| 87 | do. | do. | do. | — | 27.0 | 6 g |
| do. | do. | do. | do. | — | 27.0 | 8 g |
| 86 | 84 | do. | do. | — | 28.0 | 10 g |
| do. | do. | do. | do. | — | 29.7 | 12 g |
| do. | do. | do. | do. | — | 30.3 | 14 g |
| do. | 85 | do. | do. | — | 31.3 | 16 g |
| do. | do. | do. | do. | — | 32.7 | 18 g |
| 87 | 86 | do. | do. | — | 33.0 | 20 g |
| 90 | 88 | do. | 50 | 700 | 35.0 | — |
| do. | 89 | do. | do. | 800 | 34.3 | — |
| do. | do. | do. | do. | 900 | 33.4 | — |
| do. | do. | do. | do. | 1000 | 32.4 | — |
| 89 | 88 | do. | do. | 1150 | 28.0 | — |
| do. | do. | do. | do. | 1250 | 27.3 | — |

TABLE V(D)

| SOLUTION TEMPERATURES °C | | PRESSURES p.s.i.g. | | VOL. ULTRAFILTRATE | FLUX RATE G.F.D. | TOTAL Na₂CO₃ |
|---|---|---|---|---|---|---|
| Inlet | Outlet | Inlet | Outlet | Collected Mls. | (Gallons/ft²/day) | ADDED |
| 90 | 88 | 70 | 46 | — | 22.0 | — |
| 89 | 89 | do. | 50 | — | 24.7 | 2 g |
| do. | 88 | do. | do. | — | 25.5 | 4 g |
| do. | do. | do. | do. | — | 26.3 | 6 g |
| do. | do. | do. | do. | — | 27.0 | 8 g |
| do. | do. | do. | do. | — | 29.0 | 10 g |
| do. | do. | do. | do. | — | 29.0 | 12 g |
| do. | do. | do. | do. | — | 29.0 | 14 g |
| do. | do. | do. | do. | 100 | 29.0 | — |
| 91 | 90 | do. | do. | 400 | 28.3 | — |
| do. | do. | do. | do. | 500 | 27.0 | — |
| do. | 89 | do. | do. | 600 | 25.7 | — |
| 90 | do. | do. | 40 | 900 | 27.0 | — |
| do. | do. | do. | do. | 1000 | 26.0 | — |
| do. | do. | do. | do. | 1100 | 24.2 | — |
| 87 | 87 | do. | do. | 1250 | 23.3 | — |

The results which appear in Tables V(A) to (D) clearly show that there is a marked increase in flux rates when the calcium carrageenate is ion exchanged to give the potassium, ammonium, or sodium forms. The increase in the case of ammonium carbonate addition appeared to develop more slowly, but it is believed that this may have been due to the poor quality of the ammonium carbonate used, as this salt is not particularly stable and may have decomposed to some extent. Conversion to the ammonium form gave the greatest increase in flux rate followed by the sodium form. It is quite apparent that due to the higher flux rates obtainable, the solutions could be concentrated to much higher levels, with smaller membrane requirements. Consequently the process as a result becomes considerably more efficient. For a more effective comparison of the results, a summary appears in Table VI. Some of the properties of the products are illustrated in Table VII.

solution viscosity, are retained, and with the exception of aqueous gel strength, may even be increased, particularly in the case of the potassium form where an increase in solution viscosity, and milk reactivity occurred.

EXAMPLE VI

A quantity of *Furcellaria fastigiata* was extracted, in the presence of calcium hydroxide, to yield 10 l of filtered, neutralized (to pH 8 to 8.5) furcellaran solution (calcium furcellaran). The solution was divided into four 2.5 l portions A, B, C and D. These portions were treated in a similar manner to those in Example V except that the ultrafiltration was continued until 1.5 l of ultrafiltrate had been collected. The ultrafiltrate had in all cases a color similar to that of the original solution, indicating that there was no concentration of color bodies and impurities during the ultrafiltration stage. Four furcellaran products were obtained, (A) calcium furcellaran, (B) potassium furcellaran, (C) ammonium

TABLE VI

| VOLUME OF ULTRA-FILTRATE COLLECTED (Mls.) | FLUX RATES (G.F.D.) | | | |
|---|---|---|---|---|
| | PORTION A | PORTION B | PORTION C | PORTION D |
| START | 21.0 | 19.3 | 22.7 | 22.0 |
| 100 | 21.7 | 32.0 | — | 29.0 |
| 400 | 21.0 | 30.0 | — | 28.3 |
| 500 | 20.7 | 27.7 | 35.0 at 700 mls. | 27.0 |
| 1000 | — | 24.5 | 32.3 | 26.0 |
| 1150 | 13.3 | — | 28.0 | 24.2 at 1100 mls. |
| 1250 | 12.9 | 21.3 | 27.3 | 23.3 |

TABLE VII

| | PORTION A | PORTION B | PORTION C | PORTION D |
|---|---|---|---|---|
| Product Color | Light Tan | Cream | Cream | Cream |
| Cold Water Solubility | Insoluble | Soluble | Soluble | Soluble |
| 2% Solution Color | Slight Color | Almost Colorless | Almost Colorless | Almost Colorless |
| Viscosity[1] | 29.0 cps | 50.0 cps | 17.0 cps | 33.0 cps |
| Aqueous Gel Strength[2] | 342 g | 219 g | 138 g | 200 g |
| Milk Reactivity[3] | 69 g | 97 g | 41 g | 70 g |

[1] Viscosity of 1 per cent carrageenan solution at 25°C. using a Brookfield viscometer model No. L.V.F., spindle speed 60 R.P.M., spindle L.V. 2.
[2] Force required to push a 19 mm diameter plunger into a gel formed by dissolving 1% carrageenan + 1% potassium chloride in hot water, and cooling to 10°C.
[3] Force required to push a 29 mm diameter plunger into a gel produced by dissolving 0.15% carrageenan in hot milk and cooling to 10°C.

TABLE VIII(A)

| SOLUTION TEMPERATURES °C | | PRESSURES p.s.i.g. | | VOL. ULTRAFILTRATE | FLUX RATE G.F.D. |
|---|---|---|---|---|---|
| Inlet | Outlet | Inlet | Outlet | Collected Mls. | (Gallons/ft²/day) |
| 91 | 90 | 80 | 40 | — | 24.2 |
| 88 | 87 | do. | do. | 100 | 22.7 |
| do. | 88 | do. | do. | 200 | 21.7 |
| do. | do. | do. | do. | 300 | 20.3 |
| 87 | 86 | do. | do. | 400 | 19.3 |
| 90 | 90 | do. | do. | 500 | 19.3 |
| 98 | 89 | do. | do. | 800 | 14.4 |
| 87 | 86 | do. | 20 | 1000 | 14.7 |
| 85 | 84 | do. | 10 | 1400 | 9.4 |
| do. | 83 | do. | do. | 1500 | 8.0 |

An examination of the properties of the carrageenan produced reveals that the desirable properties of the calcium carrageenate, for example, milk reactivity and furcellaran and (D) sodium furcellaran. The ultrafiltration results appear in Tables VIII(A) to (D), respectively.

TABLE VIII(B)

| SOLUTION TEMPERATURES °C | | PRESSURES p.s.i.g. | | VOL. ULTRAFILTRATE | FLUX RATE G.F.D. | TOTAL WT. $K_2CO_3$ |
|---|---|---|---|---|---|---|
| Inlet | Outlet | Inlet | Outlet | Collected Mls. | (Gallons/ft²/day) | ADDED |
| 91 | 91 | 80 | 40 | — | 19.3 | |
| do. | do. | do. | do. | — | 19.3 | 2 g |
| do. | do. | do. | do. | — | 19.3 | 4 g |
| do. | do. | do. | do. | — | 19.7 | 6 g |
| do. | do. | do. | do. | — | 21.3 | 8 g |
| do. | do. | do. | do. | — | 22.7 | 10 g |
| do. | do. | do. | do. | — | 26.0 | 12 g |
| do. | do. | do. | do. | — | 25.7 | 14 g |
| do. | do. | do. | do. | 100 | 23.7 | |
| do. | do. | do. | do. | 300 | 22.3 | |
| do. | do. | do. | do. | 400 | 24.3 | |
| do. | do. | do. | do. | 500 | 24.3 | |
| 90 | 90 | do. | do. | 600 | 24.0 | |
| do. | do. | do. | do. | 800 | 23.3 | |
| do. | do. | do. | do. | 900 | 23.7 | |
| do. | do. | do. | 20 | 1000 | 24.7 | |
| do. | do. | do. | do. | 1100 | 24.7 | |
| do. | do. | do. | 10 | 1400 | 20.7 | |
| do. | do. | do. | do. | 1500 | 19.0 | |

TABLE VIII(C)

| SOLUTION TEMPERATURES °C | | PRESSURES p.s.i.g. | | VOL. ULTRAFILTRATE | FLUX RATE G.F.D. | TOTAL WT. $(NH_4)_2CO_3$ |
|---|---|---|---|---|---|---|
| Inlet | Outlet | Inlet | Outlet | Collected Mls. | (Gallons/ft²/day) | ADDED |
| 90 | 90 | 80 | 40 | — | 22.0 | |
| do. | do. | do. | do. | — | 20.3 | 2 g |
| do. | do. | do. | do. | — | 20.0 | 4 g |
| do. | do. | do. | do. | — | 21.7 | 6 g |
| do. | do. | do. | do. | — | 21.3 | 8 g |
| do. | do. | do. | do. | — | 22.0 | 10 g |
| do. | do. | do. | do. | — | 21.0 | 12 g |
| do. | do. | do. | do. | — | 21.0 | 14 g |
| do. | do. | do. | do. | — | 21.0 | 16 g |
| do. | do. | do. | do. | 100 | 20.7 | |
| do. | do. | do. | do. | 400 | 20.3 | |
| 89 | 89 | do. | do. | 500 | 19.0 | |
| 92 | 92 | do. | do. | 900 | 16.5 | |
| do. | do. | do. | 20 | 1000 | 22.0 | |
| do. | do. | do. | do. | 1100 | 21.3 | |
| 91 | 91 | do. | 10 | 1400 | 19.0 | |
| do. | do. | do. | do. | 1500 | 17.6 | |

TABLE VIII(D)

| SOLUTION TEMPERATURES °C | | PRESSURES p.s.i.g. | | VOL. ULTRAFILTRATE | FLUX RATE G.F.D. | TOTAL WT. $Na_2CO_3$ |
|---|---|---|---|---|---|---|
| Inlet | Outlet | Inlet | Outlet | Collected Mls. | (Gallons/ft²/day) | ADDED |
| 89 | 89 | 80 | 40 | — | 19.3 | |
| 90 | 90 | do. | do. | — | 20.0 | 2 g |
| 92 | 92 | do. | do. | — | 21.7 | 4 g |
| do. | do. | do. | do. | — | 22.3 | 6 g |
| do. | do. | do. | do. | — | 23.0 | 8 g |
| do. | do. | do. | do. | — | 24.0 | 10 g |
| do. | do. | do. | do. | — | 22.7 | 12 g |
| do. | do. | do. | do. | — | 21.3 | 14 g |
| do. | do. | do. | do. | 300 | 28.3 | |
| do. | do. | do. | do. | 400 | 28.2 | |
| do. | do. | do. | do. | 500 | 28.2 | |
| do. | do. | do. | do. | 800 | 26.7 | |
| do. | do. | do. | do. | 900 | 26.3 | |
| do. | do. | do. | 20 | 1000 | 29.0 | |
| 89 | 89 | do. | do. | 1300 | 26.7 | |
| 89 | do. | do. | do. | 1400 | 23.7 | |
| do. | do. | do. | 10 | 1500 | 23.3 | |

An examination of the results which appear in TABLES VIII(A) to (D) indicates that the ultrafiltration of furcellaran solution is affected by ion exchange in a similar fashion to that found for carrageenan in Example V. For a more effective comparison of the results shown in TABLES VIII(A) to (D) a summary is shown in Table IX. The increase in flux rates obtained represents a considerable increase in the efficiency of the process. The dry products obtained all dissolved in water to give virtually colorless solutions.

TABLE IX

| VOLUME OF ULTRAFILTRATE Collected Mls. | PORTION A | PORTION B | PORTION C | PORTION D |
|---|---|---|---|---|
| | FLUX RATES G.F.D. | | | |
| Start | 24.2 | 19.3 | 22.0 | 19.3 |
| 400 | 19.3 | 24.3 | 20.3 | 28.2 |
| 500 | 19.3 | 24.3 | 19.0 | 28.2 |
| 1000 | 14.7 | 24.7 | 22.0 | 29.0 |
| 1400 | 9.4 | 20.7 | 19.0 | 23.7 |
| 1500 | 8.0 | 19.0 | 17.6 | 23.3 |

EXAMPLE VII

A quantity of *Phyllophora membranifolia* was extracted, in the presence of calcium hydroxide, to yield just over 4 l of filtered, neutralized (to pH 8 – 8.5) phyllophoran solution (calcium phyllophoran). The solution was divided into 2 × 2 l portions, A and B. The two portions were ultrafiltered, as in the preceding examples (other than Example IV), except that in the case of portion B, ion exchange of the calcium phyllophoran was carried out, by addition of potassium carbonate, to give the potassium form. The results of ultrafiltering the two portions are shown in Tables X(A) and (B) respectively.

TABLE X(A) - Calcium Form

| SOLUTION TEMPERATURES °C | | PRESSURES p.s.i.g. | | Vol. Ultrafiltrate Collected Mls. | FLUX RATE G.F.D. (Gallons/ft²/day) |
|---|---|---|---|---|---|
| Inlet | Outlet | Inlet | Outlet | | |
| 89 | 89 | 70 | 40 | — | 34.3 |
| 91 | 91 | do. | do. | 100 | 34.3 |
| 92 | 92 | do. | do. | 200 | 33.3 |
| do. | do. | do. | do. | 300 | 31.0 |
| do. | do. | do. | do. | 400 | 30.3 |
| do. | do. | do. | do. | 500 | 29.1 |
| 93 | 93 | do. | do. | 600 | 28.0 |
| do. | do. | do. | do. | 700 | 27.2 |
| do. | do. | do. | do. | 800 | 26.0 |
| 92 | 92 | do. | do. | 900 | 24.0 |
| do. | do. | do. | do. | 1000 | 21.7 |
| 91 | 91 | do. | do. | 1200 | 15.2 |

Examination of the results which appear in Tables X(A) and (B) indicates that the ultrafiltration of phyllophoran solution is affected by ion-exchange in a similar manner to that of carrageenan and furcellaran. It is reasonable to presume that ion exchange to the sodium and/or ammonium form would give similar results.

The following is an example of ultrafiltration of sodium alginate extracted from *Ascophyllum nodosum*.

EXAMPLE VIII

A quantity of *Ascophyllum nodosum* was treated with cold dilute acid, drained and washed twice with cold water to remove excess acid. The drained seaweed was then extracted with a cold solution of sodium carbonate to produce a viscous mixture of algal residues and sodium alginate extract solution. Filter aid was added and the resulting slurry was diluted with water to reduce the solution viscosity and to facilitate filtration. Filtration gave 4 l. of dilute sodium alginate extract solution. To a 1 l portion of the solution, alcohol was added to precipitate the sodium alginate which was dried and weighed to determine its concentration in the solution, found to be 0.65 percent by weight.

The remaining 3 l. of solution was ultrafiltered as in the preceding examples (other than Example IV) but at a temperature of between 36° and 39°C., inlet pressure of 80 p.s.i., outlet pressure 20 p.s.i. Solution viscosity determinations were carried out, as the solution was concentrated, using a "Brookfield Model L.V.F." viscometer. The results are shown in Table XI.

TABLE X(B) - Potassium Form

| SOLUTION TEMPERATURES °C | | PRESSURES p.s.i.g. | | VOL. ULTRAFILTRATE Collected Mls. | FLUX RATE G.F.D. (Gallons/ft²/day) | $K_2CO_3$ ADDED |
|---|---|---|---|---|---|---|
| Inlet | Outlet | Inlet | Outlet | | | |
| 92 | 92 | 70 | 45 | — | 31.4 | |
| do. | do. | do. | do. | — | 31.4 | 2 g |
| do. | do. | do. | do. | — | 32.0 | 4 g |
| do. | do. | do. | do. | — | 32.2 | 6 g |
| do. | do. | do. | do. | — | 32.6 | 8 g |
| do. | do. | do. | do. | — | 34.3 | 10 g |
| do. | do. | do. | do. | — | 36.7 | 11 g |
| do. | do. | do. | do. | — | 37.0 | 12 g |
| do. | do. | do. | do. | 100 | 37.0 | |
| do. | do. | do. | 40 | 200 | 36.3 | |
| do. | do. | do. | do. | 300 | 35.0 | |
| do. | do. | do. | do. | 400 | 34.7 | |
| do. | do. | do. | do. | 500 | 33.0 | |
| do. | do. | do. | do. | 600 | 31.4 | |
| do. | do. | do. | do. | 700 | 29.8 | |
| do. | do. | do. | do. | 800 | 28.5 | |
| 91 | 91 | do. | do. | 900 | 26.8 | |
| do. | do. | do. | do. | 1000 | 25.0 | |
| 90 | 90 | do. | do. | 1200 | 19.6 | |

TABLE XI

| Flux Rates G.F.D. | Vol. Ultrafiltrate Obtained (mls.) | Vol. Solution Remaining (mls.) | Solution Viscosity (cps) | Solution Concentration % wt. |
|---|---|---|---|---|
| 32.4 | — | 3000 | 117.5 | 0.65 |
| 33.3 | 200 | 2800 | 143 | 0.69 |
| 32.0 | 400 | 2600 | 145.5 | 0.75 |
| 31.7 | 600 | 2400 | 155 | 0.81 |
| 26.7 | 1000 | 2000 | 230 | 0.97 |
| 22.4 | 1300 | 1700 | 317.5 | 1.14 |
| 17.6 | 1500 | 1500 | 425 | 1.3 |
| 13.7 | 1700 | 1300 | 650 | 1.5 |
| 8.7 | 2000 | 1000 | 1300 | 1.9 |

Examination of the data which appears in Table XI indicates that there is a marked increase in solution viscosity as the extract concentration increased. This increase is reflected in the ultrafiltration flux rates obtained and would ultimately limit the maximum concentration obtainable. While a higher concentration of sodium alginate than that obtained would have been possible, this Example illustrates a significant reduction in solution volume to one-third of the original.

As is indicated above, the technique of the present invention can be applied to effect purification and concentration of aqueous solutions of propylene glycol alginates. The following examples illustrate such a procedure.

EXAMPLE IX

A 40 g. sample of dry propylene glycol alginate was dissolved in 2.5 l of water to give a solution of 1.6 percent concentration. This solution was ultrafiltered as in the preceding examples at a temperature of approximately 30°c. using a 40 inch ultrafiltration tube containing a PM10 membrane. Inlet pressure was 70 p.s.i. and outlet pressure was 10 p.s.i. The viscosity of the solution before and after concentration was determined using a "Brookfield Model L.V.F." viscometer at 60 R.P.M. spindle speed. The results obtained are shown in Table XII.

TABLE XII

| Flux Rate G.F.D. | Vol. Ultrafiltrate Collected (mls.) | Vol. Solution Remaining (mls.) | Solution Concentration % wt. |
|---|---|---|---|
| 22.5 | — | 2500 | 1.6 |
| 18.2 | 250 | 2250 | 1.8 |
| 15.2 | 500 | 2000 | 2.0 |
| 12.7 | 750 | 1750 | 2.3 |
| 10.0 | 1000 | 1500 | 2.7 |
| 7.5 | 1250 | 1250 | 3.2 |
| 5.7 | 1500 | 1000 | 4.0 |
| 4.5 | 1750 | 750 | 5.3 |

Initial solution viscosity: 55.0 cps., Solution pH: 4.5
Final do. 3500 cps.

An examination of the data in Table XII indicates that the solution concentration was substantially increased by ultrafiltration. At the same time the usual impurity in propylene glycol alginate, propylene glycol formed by hydrolysis of propylene oxide, was significantly eliminated by ultrafiltration.

I claim

1. The method of purifying and concentrating an aqueous polysaccharide solution derived from marine algae which comprises subjecting said solution to ultrafiltration using a semi-permeable ultrafiltration membrane having an apparent pore diameter of from 20 Angstrom units to 400 Angstrom units and thereby causing water and low molecular weight species to pass through said membrane and the polysaccharide to be retained by said membrane.

2. The method of claim 1 wherein said ultrafiltration is carried out at a solution inlet pressure of at least 10 pounds per square inch gauge and a solution outlet pressure lower than said inlet pressure and ranging from 0 to 100 pounds per square inch gauge.

3. The method of claim 1 wherein said ultrafiltration is carried out at a solution inlet pressure of from 80 to 100 pounds per square inch gauge and a solution outlet pressure of from 0 to 20 pounds per square inch gauge.

4. The method of claim 1 wherein said ultrafiltration is carried out at a solution temperature of from 60° to 100°c.

5. The method of claim 1 wherein the pH of the solution is from 6.5 to 12.

6. The method of claim 1 wherein the pH of the solution is from 6.5 to 8.5.

7. The method which comprises subjecting an aqueous polysaccharide extract solution derived from marine algae where the polysaccharide is a calcium derivative to ion exchange so as to replace the calcium moiety of the polysaccharide with a moiety selected from the group consisting of potassium, sodium and ammonium, and subjecting the resulting solution to ultrafiltration using a semi-permeable ultrafiltration membrane having an apparent pore diameter of from 20 Angstrom units to 400 Angstrom units and thereby causing water and low molecular weight species to pass through said membrane and the polysaccharide to be retained by said membrane.

8. The method of claim 7 wherein said ion exchange is accomplished by adding a carbonate selected from the group consisting of potassium, sodium and ammonium carbonates to the calcium polysaccharide solution, separating the precipitated calcium carbonate thereby formed from the solution, and subjecting the resulting solution to said ultrafiltration.

9. The method of claim 7 wherein said ultrafiltration is carried out at a solution inlet pressure of at least 10 pounds per square inch gauge and a solution outlet pressure lower than said inlet pressure and ranging from 0 to 100 pounds per square inch gauge.

10. The method of claim 7 wherein said ultrafiltration is carried out at a solution inlet pressure of from 80 to 100 pounds per square inch gauge and a solution outlet pressure of from 0 to 20 pounds per square inch gauge.

11. The method of claim 7 wherein said ultrafiltration is carried out at a solution temperature of from 60° to 100°C.

12. The method of claim 7 wherein the pH of the solution is from 6.5 to 12.

13. The method of claim 7 wherein the pH of the solution is from 6.5 to 8.5.

14. The method of claim 1 wherein the initial polysaccharide concentration of said solution is from about 1 to 3 percent by weight and wherein said ultrafiltration is carried out until the concentrated solution has a polysaccharide concentration of from about 6 to 10 percent by weight.

15. The method of claim 14 including the further purification of the concentrated polysaccharide solution by diluting it with fresh water, and then reconcentrating the diluted solution by subjecting it to ultrafiltration.

16. The method of claim 14 including effecting further purification of the polysaccharide solution by adding fresh water to the polysaccharide solution subjected to the ultrafiltration at a rate substantially corresponding to the rate at which water is being removed in the ultrafiltrate by the ultrafiltration.

17. The method of purifying and concentrating an aqueous solution of an alginic acid derivative which comprises subjecting said solution to ultrafiltration using a semi-permeable ultrafiltration membrane having an apparent pore diameter of from 20 Angstrom units to 400 Angstrom units and thereby causing water and low molecular weight species to pass through said membrane and the alginic acid derivative to be retained by said membrane.

18. The method of claim 17 wherein said derivative is a sodium, potassium or ammonium salt of alginic acid.

19. The method of claim 17 wherein said derivative is an ester of alginic acid.

20. The method of claim 19 wherein said derivative is a propylene glycol ester of alginic acid.

* * * * *